(12) United States Patent
Baumgarten

(10) Patent No.: US 6,460,938 B1
(45) Date of Patent: *Oct. 8, 2002

(54) LIGHT-WEIGHT VEHICLE WHEEL

(75) Inventor: John M. Baumgarten, Novi, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,268

(22) Filed: Apr. 4, 2000

Related U.S. Application Data

(63) Continuation-in-part of application No. PCT/US97/21891, filed on Nov. 26, 1997.
(60) Provisional application No. 60/031,784, filed on Nov. 26, 1996.

(51) Int. Cl.⁷ .................................................. B60B 7/06
(52) U.S. Cl. .................................. 301/37.11; 301/37.43
(58) Field of Search .......................... 301/37.1, 37.28, 301/37.42, 37.43, 37.11

(56) References Cited

U.S. PATENT DOCUMENTS

| | | |
|---|---|---|
| 3,263,315 A | 8/1966 | O'Brien |
| 3,669,501 A * | 6/1972 | Derleth .................... 301/37.42 |
| 3,726,566 A | 4/1973 | Beith |
| 3,762,677 A * | 10/1973 | Adams .................... 301/37.43 |
| 3,956,451 A | 5/1976 | Adams |
| 4,067,600 A | 1/1978 | Knorr et al. |
| 4,105,255 A | 8/1978 | Kopp |
| 4,316,637 A | 2/1982 | Reynolds et al. |
| 4,344,654 A | 8/1982 | Apezynski |
| 4,530,542 A | 7/1985 | Spiegel et al. |
| 4,645,268 A | 2/1987 | Carlson |
| 4,659,148 A | 4/1987 | Grill |
| 4,861,538 A * | 8/1989 | Stalter, Sr. ........... 301/37.43 X |
| 4,976,497 A | 12/1990 | Post et al. |
| 5,031,966 A | 7/1991 | Oakey |
| 5,096,263 A | 3/1992 | Wright |
| 5,128,085 A | 7/1992 | Post et al. |
| 5,292,182 A | 3/1994 | Kanazawa et al. |
| 5,368,370 A | 11/1994 | Beam |
| 5,427,171 A | 6/1995 | Prieto |
| 5,458,401 A | 10/1995 | Baccman |
| 5,577,809 A * | 11/1996 | Chase ..................... 301/37.43 |
| 5,595,423 A | 1/1997 | Heck et al. |
| 5,597,213 A | 1/1997 | Chase |
| 5,636,906 A | 6/1997 | Chase |
| 5,651,590 A | 7/1997 | Word |
| 5,842,750 A * | 12/1998 | Murray et al. ........... 301/37.43 |
| 5,874,037 A | 2/1999 | Saia et al. |

FOREIGN PATENT DOCUMENTS

| | | |
|---|---|---|
| EP | 0475915 A1 | 3/1992 |
| GB | 2109317 A | 6/1983 |
| JP | 53-69302 | 6/1978 |
| JP | 63-038001 A | 2/1988 |
| JP | 63-258202 A | 10/1988 |
| JP | 63-315302 A | 12/1988 |
| WO | WO 94/22679 | 10/1994 |

* cited by examiner

Primary Examiner—Russell D. Stormer
(74) Attorney, Agent, or Firm—MacMillan, Sobanski & Todd, LLC

(57) ABSTRACT

A vehicle wheel includes a one-piece backbone wheel cast from a light-weight metal. The backbone wheel includes a generally cylindrical wheel rim adapted to carry a vehicle tire, and a wheel disc backbone extending across the wheel rim. The wheel disc backbone is adapted to be mounted on the vehicle. A styled plastic wheel face is molded on at least a portion of the wheel disc backbone.

19 Claims, 3 Drawing Sheets

LIGHT-WEIGHT VEHICLE WHEEL

CROSS-REFERENCE TO RELATED APPLICATION

This application is a continuation-in-part of International Application No. PCT/US97/21891, which was filed on Nov. 26, 1997, and claims benefit of Provisional Patent Application Serial No. 60/031,784, which was filed on Nov. 26, 1996. International Application No. PCT/US97/21891 entered the U.S. national stage with U.S. patent application Ser. No. 09/318,901, which was filed on May 26, 1999, now U.S. Pat. No. 6,068,350 that issued on May 30, 2000.

BACKGROUND OF THE INVENTION

This invention relates in general to light-weight vehicle wheels, and in particular to a vehicle wheel including a one-piece backbone wheel cast from a light-weight metal and a styled plastic wheel face molded on the backbone wheel.

In the early 1970's, Motor Wheel Corporation developed and introduced a composite metal-plastic styled wheel known as a "POLYCAST" wheel. The POLYCAST wheel included a metal wheel of simple, conventional configuration as a basic structural component, and a permanently adhered ornamental plastic body covering portions of the wheel disc. The metal wheel portion of the POLYCAST wheel was formed from two pieces of stamped steel which were welded together.

Cast vehicle wheels formed from light-weight metals, such as aluminum, magnesium, titanium, and alloys thereof, have become increasingly popular. Such cast wheels provide both a reduction in weight from steel wheels and can be cast having an attractive styled appearance.

SUMMARY OF THE INVENTION

A conventional cast vehicle wheel presents disadvantages in terms of weight and cost of the wheel. Much of the metal used in the wheel disc of a conventional cast vehicle wheel is added for style alone—it is not needed for high stress areas or load carrying capabilities. For example, a conventional cast vehicle wheel has relatively wide spokes. The spokes must also be cast relatively thick to allow the molten metal to fill the entire mold during the casting process. Even though the cast vehicle wheel is made from a light-weight metal, the greater amount of metal used increases the weight and cost of the cast wheel.

The POLYCAST wheel also had some disadvantages. Because the metal wheel portion of the POLYCAST wheel was made from two pieces of steel which were welded together, the costs of production and tooling were higher than the costs for making a one-piece wheel. The stamping process used to make the metal wheel portion was very limited in its ability to produce a wheel disc that was varied in thickness in different portions of the disc. Consequently, the stamped wheel disc was relatively thick throughout the entire area of the disc. The use of steel instead of a light-weight metal in the metal wheel portion of the POLYCAST wheel, and the relatively thick wheel disc, created a relatively heavy wheel.

The ornamental plastic body of the POLYCAST wheel did not cover a steel flange on the outboard end of the wheel rim, around the perimeter of the wheel disc. The plastic body covering most of the wheel disc was finished with a chrome plating, while the steel flange was usually finished with a silver paint, because steel is more difficult to chrome plate than plastic. The difference between the silver paint on the flange and the chrome plating on the wheel disc could be easily observed, which detracted from the appearance of the wheel.

The present invention provides a light-weight vehicle wheel which overcomes the drawbacks associated with conventional cast vehicle wheels and with the POLYCAST wheel. The vehicle wheel includes a one-piece backbone wheel cast from a light-weight metal. The backbone wheel comprises a generally cylindrical wheel rim adapted to carry a vehicle tire, and a wheel disc backbone extending across the wheel rim. The wheel disc backbone is adapted to be mounted on the vehicle. A styled plastic wheel face is molded on the wheel disc backbone.

In another embodiment of the invention, the styled plastic wheel face is molded on the wheel disc backbone and the outboard end of the wheel rim. The plastic wheel face forms a plastic flange on the outboard end of the wheel rim.

In a further embodiment, the wheel disc backbone comprises a wheel hub adapted to be mounted on the vehicle and a plurality of backbone spokes extending between the wheel hub and the wheel rim. The backbone spokes have a thickness of not greater than about 1.5 inches.

The invention also contemplates a method of producing a vehicle wheel. The method includes the steps of: (a) casting a one-piece backbone wheel from a light-weight metal, the backbone wheel comprising a generally cylindrical wheel rim adapted to carry a vehicle tire, and a wheel disc backbone extending across the wheel rim, the wheel disc backbone adapted to be mounted on the vehicle; and (b) molding a styled plastic wheel face on the wheel disc backbone.

In contrast to the wheel portion of the POLYCAST wheel, which was made by a stamping process, the backbone wheel of the present invention is made by a casting process. The casting process allows the thickness of different portions of the wheel disc backbone to be varied, so that the wheel disc backbone can be formed from the minimum amount of metal needed to withstand loads and stresses on the wheel disc. Reducing the amount of metal provides significant savings in weight and cost of the wheel. The weight of the wheel is further reduced compared to the POLYCAST wheel by making the backbone wheel from a light-weight metal instead of from steel. In contrast to the two-piece welded wheel portion of the POLYCAST wheel, the one-piece cast backbone wheel of the present invention lowers tooling costs, lowers production costs, and provides more flexible production.

Unlike a conventional cast vehicle wheel in which much of the metal used in the wheel disc is added for style alone, the backbone wheel of the present invention can use the minimum amount of metal in the wheel disc backbone needed to withstand loads and stresses on the wheel disc. The styled plastic wheel face provides styling for the wheel disc. Consequently, the vehicle wheel of the present invention can be constructed with a smaller amount of metal than a conventional cast vehicle wheel, thereby reducing the weight and cost of the wheel. With a lighter wheel, a vehicle accelerates faster and/or with less gas consumption. The suspension system adapts to irregularities in the road surface better. Lighter springs and shock absorbers can be used on the vehicle. The styled plastic wheel face can be molded for less cost than a metal wheel face, because the mold produces a more net shape in plastic which requires less secondary work. The plastic wheel face can also be chrome-plated or painted at a lower cost than metal because of the smoother surface finish produced. The molding of plastic instead of metal results in longer mold life and lower tool maintenance cost. In the preferred embodiment, the plastic wheel face extends over the outboard surface of the wheel flange on the outboard end of the wheel. This eliminates the need to apply a surface finish to two different materials.

Various other advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
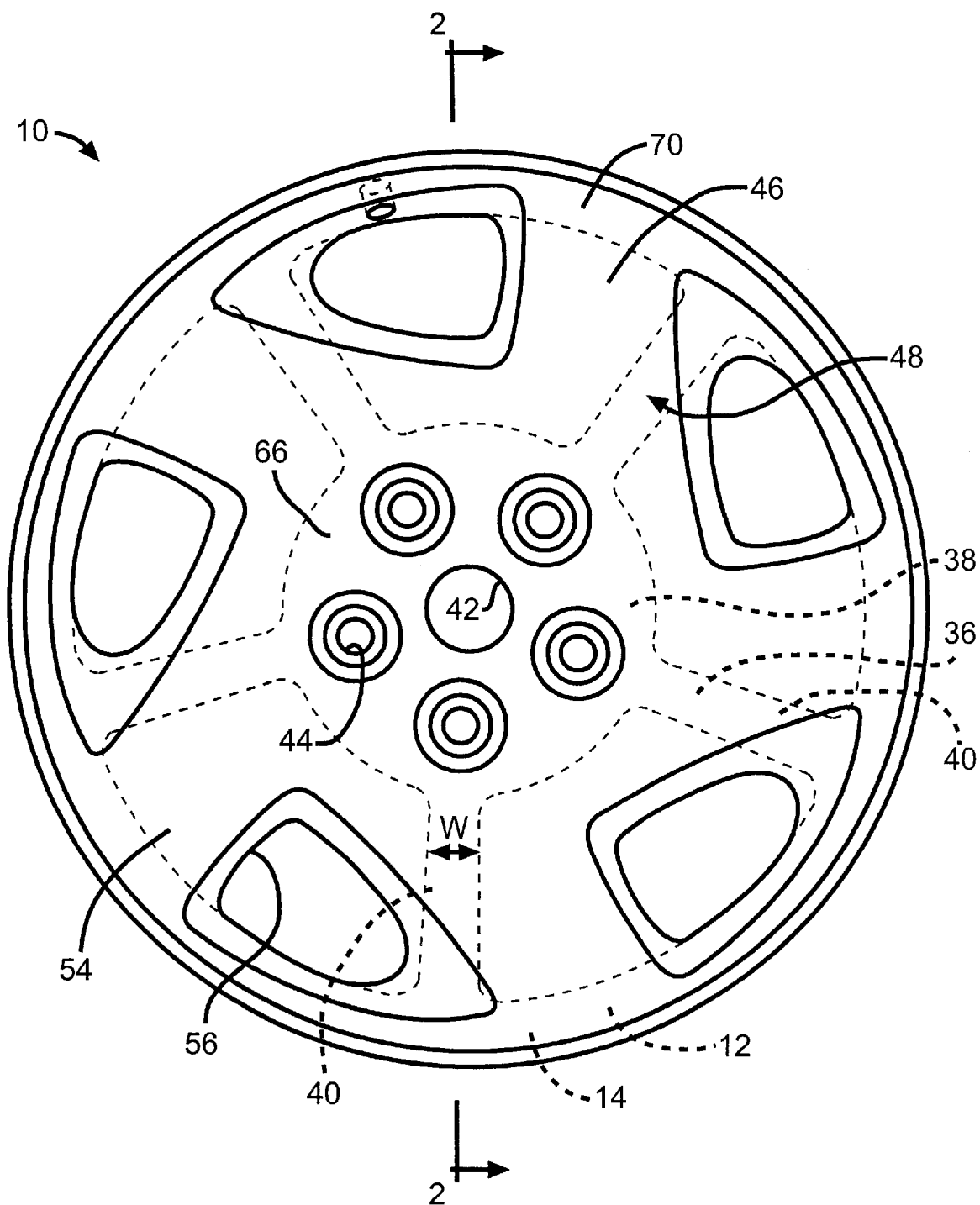
FIG. 1 is a front view of a light-weight vehicle wheel in accordance with the invention.
Figure 2:
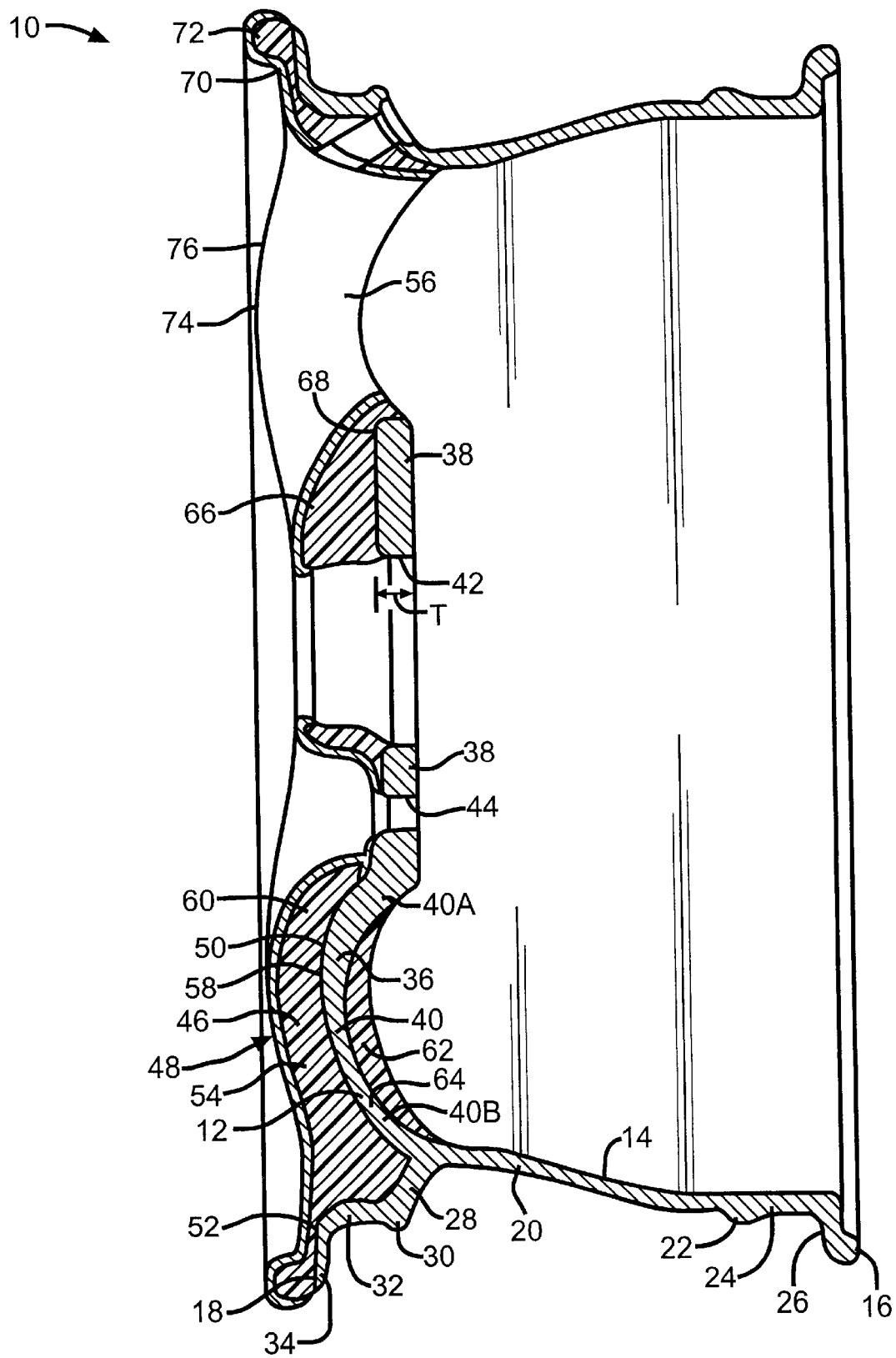
FIG. 2 is a cross-sectional view of the vehicle wheel taken along line 2—2 of FIG. 1.

Referring now to the drawings, FIGS. 1 and 2 illustrate a vehicle wheel 10 in accordance with the present invention. The vehicle wheel 10 includes a backbone wheel 12 formed from a light-weight metal. The backbone wheel 12 includes a generally cylindrical wheel rim 14 adapted to carry a pneumatic vehicle tire (not shown). The wheel rim 14 has an inboard end 16 (at the right in FIG. 2) and an outboard end 18 (at the left in FIG. 2). The wheel rim 14 includes a recessed deepwell 20. The inboard end of the deepwell 20 terminates in a circumferential inboard tire safety bead 22. Adjacent to the inboard tire safety bead 22 is an inboard tire bead seat 24 which is adapted to carry an inboard tire wall bead of the pneumatic vehicle tire. The inboard end 16 of the wheel rim 14 terminates in an inboard tire retaining flange 26. The outboard end of the deepwell 20 is formed as an annular wall 28 which extends in an outward radial direction. The annular wall 28 terminates in an outboard tire safety bead 30. An outboard tire bead seat 32, which is adapted to carry an outboard tire wall bead of the pneumatic vehicle tire, is adjacent to the outboard tire safety bead 30. The outboard end 18 of the wheel rim 14 has a radially extending outboard tire retaining flange 34.

The backbone wheel 12 also includes a wheel disc backbone 36 extending across the outboard end 18 of the wheel rim 14. In the illustrated embodiment, the wheel disc backbone 36 includes a central wheel hub 38 adapted to be mounted on the vehicle, and a plurality of backbone spokes 40 extending between the wheel hub 38 and the wheel rim 14. Unlike the styled spokes of a conventional cast vehicle wheel, the backbone spokes 40 can be formed with only enough metal to provide the structure needed to withstand loads and stress on the wheel disc. The illustrated backbone spokes 40 are relatively small in both width W (FIG. 1) and thickness T (FIG. 2). Preferably, the backbone spokes 40 have both a width and a thickness of not greater than about 1.5 inches, and more preferably not greater than about 1 inch.

The casting process allows the backbone spokes 40 to be formed with relatively thick portions where more structure is needed and relatively thin portions to conserve metal where it is not needed. In the illustrated embodiment, the wheel hub 38 and the radially inner portion 40a of the backbone spoke 40 are relatively thick, and the backbone spoke 40 tapers so that the radially outer portion 40b of the backbone spoke 40 is relatively thin. Preferably, the wheel disc backbone 36 is varied in thickness such that it includes relatively thin portions 40b which are at least about 30% thinner than relatively thick portions 40a of the wheel disc backbone 36, and more preferably at least about 50% thinner.

A pilot hole 42 is formed through the center of the wheel hub 38 for mounting the vehicle wheel 10 on an axle of the vehicle. A plurality of wheel lug holes 44 are formed through the wheel hub 38 equally spaced along a bolt circle which is concentric with the pilot hole 12.

The backbone wheel 12 is cast in one piece. Any suitable casting method can be used for casting the backbone wheel 12, such as gravity or low pressure casting. The backbone wheel 12 can be cast from any suitable light-weight, high strength metal. Some examples of suitable metals include aluminum, magnesium, titanium, and alloys of these metals. Preferably, the backbone wheel 12 is cast from aluminum or aluminum alloy. The casting can be machined as needed to a final shape.

The vehicle wheel 10 of the present invention also includes a styled plastic wheel face 46. The plastic wheel face 46 is molded on the wheel disc backbone 36, and preferably also on the outboard end 18 of the wheel rim 14. The plastic wheel face 46 and the metallic wheel disc backbone 36 comprise a composite wheel disc 48. The wheel disc backbone 36 provides structural support for the wheel disc 48, while the plastic wheel face 46 provides a decorative outboard face for the vehicle wheel 10. Because the styling of the plastic wheel face 46 is not constrained by structural wheel requirements, the plastic wheel face 46 can be formed having practically any desired style, such as a fanciful design. Preferably, the plastic wheel face 46 substantially completely covers the outboard side 50 of the wheel disc backbone 36 and the outboard side 52 of the outboard end 18 of the wheel rim 14, so that only the styled plastic wheel face 46 is visible when a tire is mounted on the vehicle wheel 10.

In the embodiment shown, the plastic wheel face 46 includes a plurality of styled plastic spokes 54 which are molded on the backbone spokes 40 of the backbone wheel 12. The illustrated plastic spokes 54 are relatively wide spokes having styled triangular openings 56 between the spokes 54. Preferably, the plastic spokes 54 substantially completely cover the outboard side 58 of the backbone spokes 40. In the illustrated embodiment, the plastic spokes 54 also substantially surround the backbone spokes 40. As shown in FIG. 2, the plastic spokes 54 include an outboard portion 60 molded on the outboard side 58 of the backbone spokes 40, and an inboard portion 62 molded on the inboard side 64 of the backbone spokes 40.

The illustrated plastic wheel face 46 also includes a central hub portion 66 which is molded on the wheel hub 38 of the wheel disc backbone 36. Preferably, the hub portion 66 of the plastic wheel face 46 substantially completely covers the outboard side 68 of the wheel hub 38. The hub portion 66 of the plastic wheel face 46 cooperates with the wheel hub 38 to define the pilot hole 42.

The illustrated plastic wheel face 46 also includes a circumferential portion 70 which is molded on the outboard side 52 of the outboard end 18 of the wheel rim 14. As best shown in FIG. 2, the circumferential portion 70 of the plastic wheel face 46 forms an axially extending plastic flange 72 on the outboard end 18 of the wheel rim 14. The plastic flange 72 may function as a weight retention flange 72 which provides a lip for securing balance weights to the vehicle wheel 10.

The plastic wheel face 46 can be formed from any plastic material suitable for molding, such as, for example, polyurethane, polypropylene, polyethylene, polycarbonate, polyethylene terephthalate, polybutylene terephthalate, polyamide, or acrylonitrile-butadiene-styrene copolymer. Preferably, the plastic wheel face 46 is formed from a polyurethane.

Preferably, the outboard side 74 of the plastic wheel face 46 is plated with a decorative layer of metal such as chrome plating 76. The plastic wheel face 46 is much easier and lower in cost to chrome-plate than a metal wheel face. By making the flange 72 from plastic instead of metal, the entire plastic wheel face 46 can be chrome-plated instead of having a painted metal flange, which would detract from the appearance of the vehicle wheel 10.

The vehicle wheel 10 of the present invention looks like a conventional cast vehicle wheel, but it is much lighter in weight. By replacing a large percentage of the metal of the composite wheel disc 48 with plastic, significant savings are achieved in both weight and cost. By way of comparison, aluminum has a density of 2.7 g/cc while plastic has a density of 1 g/cc, resulting in a weight savings of 1.7 g/cc. As an example, a vehicle wheel 10 according to the invention suitable for use on a mid-size car (e.g., 15 feet by 6 feet) would typically weigh about 12 pounds total (10.5 pounds for the aluminum backbone wheel 12 and 1.5 pounds for the plastic wheel face 46). In contrast, a conventional cast aluminum wheel for the same size car would weigh about 16½ pounds. Thus, in this example the vehicle wheel 10 of the invention saves about 4.5 pounds in weight compared to the conventional cast vehicle wheel.

Preferably, the vehicle wheel 10 provides at least about a 20% reduction in weight compared to a conventional cast vehicle wheel having the same shape and size, and more preferably at least about a 25% reduction in weight.

In a preferred embodiment of the invention, the backbone wheel 12 is "universal" in configuration such that it is adapted to be mounted on a plurality of different types of vehicle platforms. The use of such a universal backbone wheel 12 reduces the per unit cost of the vehicle wheel 10 due to increased efficiency of production and a reduction in the number of molds required, and reduces wheel validation costs since one vehicle wheel 10 can be qualified for use on a number of different vehicle platforms. The appearance of the vehicle wheel 10 can be easily changed for different vehicle platforms by changing the styling of the plastic wheel face 46 molded on the backbone wheel 12.

Figure 3:
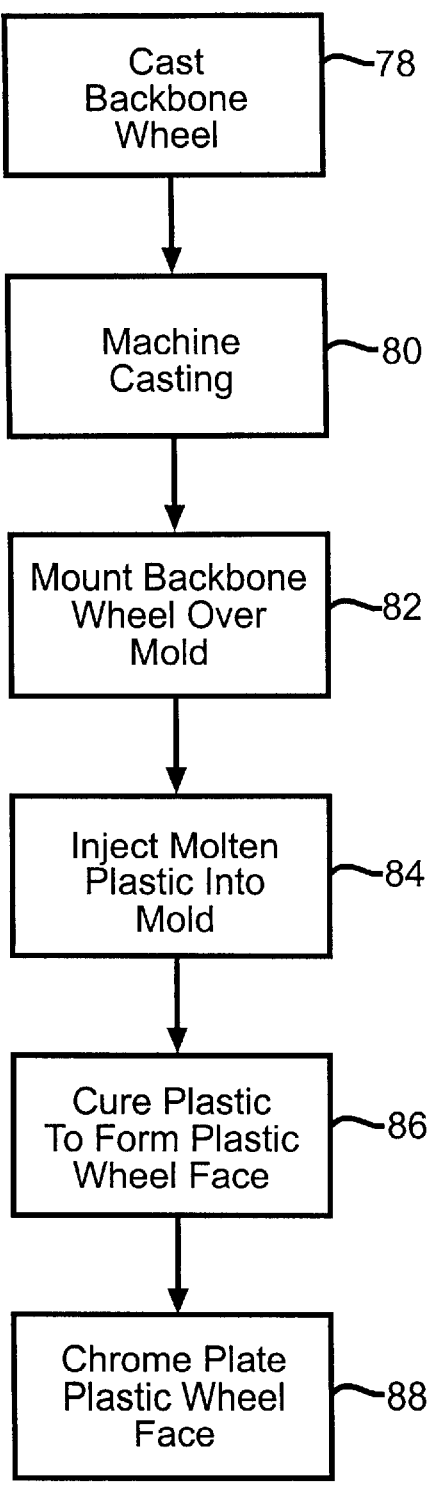
FIG. 3 is a flow chart of a preferred method of manufacturing the vehicle wheel shown in FIGS. 1 and 2.

FIG. 3 illustrates a preferred method of manufacturing a vehicle wheel 10 in accordance with the invention. In functional block 78, a backbone wheel is cast as one piece from a light-weight metal. In functional block 80, the casting is machined to a final shape. In functional block 82, the backbone wheel is mounted above a mold having the shape of a plastic wheel face, with the wheel disc backbone and the outboard end of the wheel rim extending into the mold. The plastic wheel face 46 can be molded on the wheel disc backbone 36 and the outboard end 18 of the wheel rim 14 by any suitable molding method. In a preferred embodiment, the plastic wheel face 46 is molded by an insert molding method. In this method, the backbone wheel 12 is mounted above a mold having the shape of the plastic wheel face 46, with the wheel disc backbone 36 and the outboard end 18 of the wheel rim 14 extending into the mold cavity (not shown). In functional block 84, a molten plastic is injected under pressure into the mold to fill the mold cavity. Suitable equipment and methods of molding plastics on metal pieces are well known in the field of plastics molding. In functional block 86, the plastic is allowed to cure to form the plastic wheel face. Lastly, in functional block 88, the outboard side of the plastic wheel face is plated with a layer of chrome plating.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope. It will be appreciated that the wheel illustrated in FIGS. 1 and 2 is meant to be exemplary and that the invention also can be practiced to form wheels having other plastic wheel face shapes.

What is claimed is:

1. A vehicle wheel comprising:

a one-piece universal backbone wheel cast from a light-weight metal, said wheel adapted to be mounted upon a plurality of vehicles, said wheel comprising a generally cylindrical wheel rim adapted to carry a vehicle tire, said wheel rim having an outboard end and an inboard end, said wheel rim including a deep well formed between said outboard and inboard ends, said deep well defining a deep well wall which is adjacent to said outboard end of said wheel rim, said wheel also having a central hub supported within said rim by a plurality of radially extending spokes, said spokes having a generally arcuate shape with one end of each spoke terminating upon said hub and the other end of each spoke terminating on said deep well wall whereby the spoke forms a generally radial arch between said hub and said deep well wall and the amount of material included in an outboard wheel sidewall is minimized while providing sufficient strength to support a vehicle; and a styled plastic wheel face molded directly upon at least a portion of said wheel disc, such that said styled plastic wheel face provides a pleasing esthetic appearance to the wheel.

2. The vehicle wheel defined in claim 1 wherein the backbone wheel includes an outboard tire bead retaining flange and the plastic wheel face extends over the flange.

3. The vehicle wheel defined in claim 2 wherein the backbone wheel includes a wheel hub and the plastic wheel face extends over the wheel hub.

4. The vehicle wheel defined in claim 3 wherein the vehicle wheel is at least about 20% reduced in weight compared to a vehicle wheel having the same shape but cast totally from the light-weight metal instead of having the plastic wheel face.

5. The vehicle wheel defined in claim 4 wherein the cast wheel disc backbone is varied in thickness such that it includes relatively thin portions which are at least about 30% thinner than relatively thick portions of the wheel disc backbone.

6. The vehicle wheel defined in claim 5 wherein the relatively thin portions are at least about 50% thinner than the relatively thick portions.

7. The vehicle wheel defined in claim 6 wherein the backbone wheel is universal in configuration such that it is adapted to be mounted on a plurality of different types of vehicle.

8. The vehicle wheel defined in claim 7 wherein the backbone wheel includes a plurality of backbone spokes extending between the wheel hub and the wheel rim, the backbone spokes having a thickness of not greater than about 1.5 inches.

9. The vehicle wheel defined in claim 8 wherein the backbone spokes have a thickness of not greater than about 1 inch.

10. A vehicle wheel comprising:
   a one-piece universal backbone wheel cast from a light-weight metal, said wheel adapted to be mounted upon a plurality of vehicles, said wheel comprising a generally cylindrical wheel rim adapted to carry a vehicle tire, the wheel rim having an outboard end and an inboard end, said wheel rim including a deep well formed between said outboard and inboard ends, said deep well defining a deep well wall which is adjacent to said outboard end of said wheel rim, said wheel also having a central hub supported within said rim by a plurality of radially extending spokes, said spokes having a generally arcuate shape with one end of each spoke terminating upon said hub and the other end of each spoke terminating on said deep well wall whereby the spoke forms a generally radial arch between said hub and said deep well wall to minimize the amount of metal utilized to form the wheel while providing sufficient strength to support a vehicle; and
   a styled plastic wheel face molded directly upon at least a portion of said wheel disc and the outboard end of the wheel rim, the plastic wheel face forming a plastic flange on the outboard end of the wheel rim, such that said styled plastic wheel face provides a pleasing esthetic appearance to the wheel.

11. The vehicle wheel defined in claim 10 wherein the plastic wheel face is metal-plated on an outboard surface of the plastic wheel face.

12. The vehicle wheel defined in claim 11 wherein the wheel hub is covered by the plastic wheel face.

13. The vehicle wheel defined in claim 12 wherein the backbone wheel is universal in configuration such that it is adapted to be mounted on a plurality of different types of vehicle.

14. A method of producing a vehicle comprising:
   (a) casting a one-piece universal backbone wheel from a light-weight metal, the wheel adapted to be mounted upon a plurality of vehicles, the backbone wheel comprising a generally cylindrical wheel rim adapted to carry a vehicle tire, said wheel rim having an outboard end and an inboard end, said wheel rim including a deep well formed between said outboard and inboard ends, said deep well defining a deep well wall which is adjacent to said outboard end of said wheel rim, said wheel also having a central hub supported within said rim by a plurality of radially extending spokes, said spokes having a generally arcuate shape with one end of each spoke terminating upon said hub and the other end of each spoke terminating on said deep well wall whereby the spoke forms a generally radial arch between said hub and said deep well wall and the amount of material included in an outboard wheel sidewall is minimized while providing sufficient strength to support a vehicle; and
   (b) molding a styled plastic wheel face directly upon at least a portion of the wheel disc, such that the styled plastic wheel face provides a pleasing esthetic appearance to the wheel.

15. The method defined in claim 14 comprising an additional step, between steps (a) and (b), of machining the casting.

16. The method defined in claim 15 comprising an additional step, after molding the wheel face in step (b), of curing the plastic.

17. The method defined in claim 16 comprising an additional step, after curing the plastic, of chrome-plating the plastic wheel face.

18. The method defined in claim 17 wherein the wheel disc backbone is cast having a varying thickness such that it includes relatively thin portions which are at least about 30% thinner than relatively thick portions of the wheel disc backbone.

19. The method defined in claim 18 wherein the cast backbone wheel has an outboard end and an inboard end, and wherein method step (b) comprises molding the plastic wheel face on the wheel disc backbone and the outboard end of the wheel rim such that the plastic wheel face forms a plastic flange on the outboard end of the wheel rim.

\* \* \* \* \*